(12) United States Patent
Norris et al.

(10) Patent No.: US 7,577,116 B2
(45) Date of Patent: Aug. 18, 2009

(54) TIMESLOT ASSIGNMENT MECHANISM FOR SATELLITE COMMUNICATION NETWORK

(75) Inventors: James A. Norris, Fairport, NY (US); Gerald Saeva, Scottsville, NY (US); Thomas Kenney, Fairport, NY (US); Kenneth Arndt, Rochester, NY (US); Kenneth Symons, Honeoye Falls, NY (US); Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 378 days.

(21) Appl. No.: 11/550,023

(22) Filed: Oct. 17, 2006

(65) Prior Publication Data
US 2008/0089270 A1    Apr. 17, 2008

(51) Int. Cl.
*H04B 7/212* (2006.01)
*H04J 3/00* (2006.01)
(52) U.S. Cl. ............... 370/321; 370/442; 370/337; 370/347; 370/345
(58) Field of Classification Search ............... 370/319, 370/312, 337, 347, 442, 461, 465, 104, 216, 370/324, 510, 106
See application file for complete search history.

(56) References Cited

U.S. PATENT DOCUMENTS

| | | | |
|---|---|---|---|
| 4,688,216 A | 8/1987 | Saburi | ............... 370/104 |
| 5,392,450 A * | 2/1995 | Nossen | ............... 455/12.1 |
| 5,857,092 A * | 1/1999 | Nakamura et al. | ............... 710/62 |

OTHER PUBLICATIONS

Chandler, UHF SATCOM Slot-connection Conflicts Caused by Half-Duplex Radio Equipment, 2000, IEEE http://ieeexplore.ieee.org/stamp/stamp.jsp?arnumber=904092&isnumber=19554.*
Xu et al., Supplement Multi-Media Services for ACeS, Oct. 31, 1999, Military Communications Conference Proceedings, pp. 883-886.
Huckell et al., The Integrated Waveform, a Proposed Improvement to the UHF Satcom DAMA Standards, Oct. 28, 2001, Communications for Network-Centric Operations: Creating the Information Force, IEEE Military Communications Conference, pp. 687- 693.
Chandler et al., UHF Satcom Slot-Connection Conflicts Caused by Half-Duplex Radio Equipment, Oct. 22, 2000, $21^{st}$ Century Military Communications Conference Proceedings, pp. 1066-1075.
Szelistowski, Applicability of Demand Assigned Multiple Access (DAMA) Waveforms for the Integrated Broadcast Service (IBS), Oct. 22, 2000, $21^{st}$ Century Military Communications Conference Proceedings, pp. 1192-1198.

* cited by examiner

*Primary Examiner*—Rafael Pérez-Gutiérrez
*Assistant Examiner*—Marisol Fahnert
(74) *Attorney, Agent, or Firm*—Allen, Dyer, Doppelt, Milbrath & Gilchrist, P.A.

(57) ABSTRACT

A time division multiple access (TDMA) waveform for controlling a MIL-STD-188-183 compliant demand assignment multiple access (DAMA) satellite communication network contains a short duration and minimal data content, time-hack, that is repeatedly transmitted by a supervisory control radio, so that the time hack occurs twice within a DAMA frame, ensuring that every radio can acquire frame synchronization, irrespective of overlap in receipt of one of the time-hacks with a voice/data channel transmission by that radio. The time-hack also identifies which one among a list of different frame formats stored in the radio is to be employed.

14 Claims, 4 Drawing Sheets

TIMESLOT ASSIGNMENT MECHANISM FOR SATELLITE COMMUNICATION NETWORK

FIELD OF THE INVENTION

The present invention relates in general to satellite communication (SATCOM) networks and communication control mechanisms thereof, and is particularly directed to a reduced complexity timeslot assignment mechanism that subdivides a respective demand assignment, multiple access (DAMA) frame into predefined sets of timeslots. Repeated in prescribed, spaced apart individual timeslots is a 'time-hack', that is used both as a timebase reference, and to specify which one of a plurality of available frame formats, each of which contains a different arrangement of time-hack, voice and data channels, is to be used by network participants.

BACKGROUND OF THE INVENTION

DAMA satellite communication networks have enjoyed widespread use in a variety of applications, such as, but not limited to military environments. In certain military applications, there is an established requirement issued by the Department of Defense, known as MIL-STD-188-183, that sets forth interoperability standards with which (5 KHz and 25 KHz UHF) satellite communication equipment must conform. A reduced complexity example of such a SATCOM network is diagrammatically illustrated in FIG. 1 as comprising a (geosynchronous) communication satellite 10 and a plurality of (mobile) terrestrial transceivers/radios 12.

In such as network, participation and operation of each user's radio is controlled by way of a dedicated device, known as a DAMA channel controller 14, which is typically a relatively large (rack-mounted) and complex piece of equipment, that is separate from the deployed radios, and considered by users to be difficult to configure and operate. In addition to the complexities involved in installing and operating the DAMA controller, configuring the field-deployed DAMA radios themselves are also a very demanding task, as these radios rely upon a very complex and time-consuming 'orderwire' that is transmitted by the DAMA controller. Indeed, setting up and configuring the radios of a conventional DAMA network can take up to ten minutes or more—which can be a major shortcoming in a military environment, where speed of deployment and ease of use are critical to mission success and safety.

In an effort to reduce the difficulty in configuring and operating the deployed radios, the Defense Information Systems Agency (DISA) has proposed an Integrated Waveform (IW), that has been designed to take advantage of the higher data rate, continuous phase modulation (CPM) modems used in newer radio architectures, which offer a substantial improvement (e.g., doubling) in throughput of existing satellite channels. Unfortunately, this newly proposed integrated waveform is complex and does not address the above-referenced shortcomings of conventional DAMA controllers. Indeed, it has been found that IW controllers are more complicated to operate than existing DAMA controllers. Moreover, deployment of IW-based networks is not currently expected to take place for several more years.

SUMMARY OF THE INVENTION

In accordance with the present invention, these and other drawbacks of conventional and proposed IW-based DAMA satellite communication networks of the type described above are successfully addressed by a new and improved timeslot assignment mechanism that is executed by the communications controller of a respective satellite communications transceiver/radio. Pursuant to this timeslot assignment mechanism, a respective time interval (demand assignment, multiple access (DAMA) frame), which conforms with MIL-STD-188-183 and is available for satellite-linked voice and data communications among users of the network, is subdivided into predefined sets of timeslots, some of which, designated as 'time-hacks', are used as a timebase reference for frame synchronization and convey frame format information, and others of which constitute voice/data channels, during which users (transceivers) of the network may conduct satellite-based communication sessions.

The time hack, which is a relatively brief, reduced complexity waveform, is repetitively transmitted by one of the deployed radios that has been designated as a 'supervisory controller' radio. The rate at which the time hack is repeated is effective to place the time hack at multiple, temporally spaced apart intervals within each DAMA frame, and serves to ensure that every radio of the network will be able to acquire the time-hack, irrespective of an overlap in receipt of one of the time-hacks with a transmission by a radio, associated with the propagation delay to the satellite.

More particularly, due to the propagation delay between a deployed terrestrial radio and the satellite, and the fact that frame synchronization is referenced to the satellite, it is necessary for a user to transmit on its voice/data channel ahead of the time that the transmitted message will actually arrive at the satellite. This 'in advance' transmission of a voice/data channel may overlap the time at which the time hack (that is being repeatedly transmitted by the controller radio) is arriving at the user's radio from the satellite, so that the user will not successfully receive that time hack. However, because the time hack is repeated at spaced apart intervals within the DAMA frame, the user is ensured of acquiring frame synchronization (from another (repeated) time hack within the frame).

In addition to providing frame synchronization, the time-hack contains a digital code that specifies which one of a plurality of available frame formats, each of which contains a different arrangement of time-hack, voice and data channels, is to be used by network participants.

DETAILED DESCRIPTION

Figure 1:
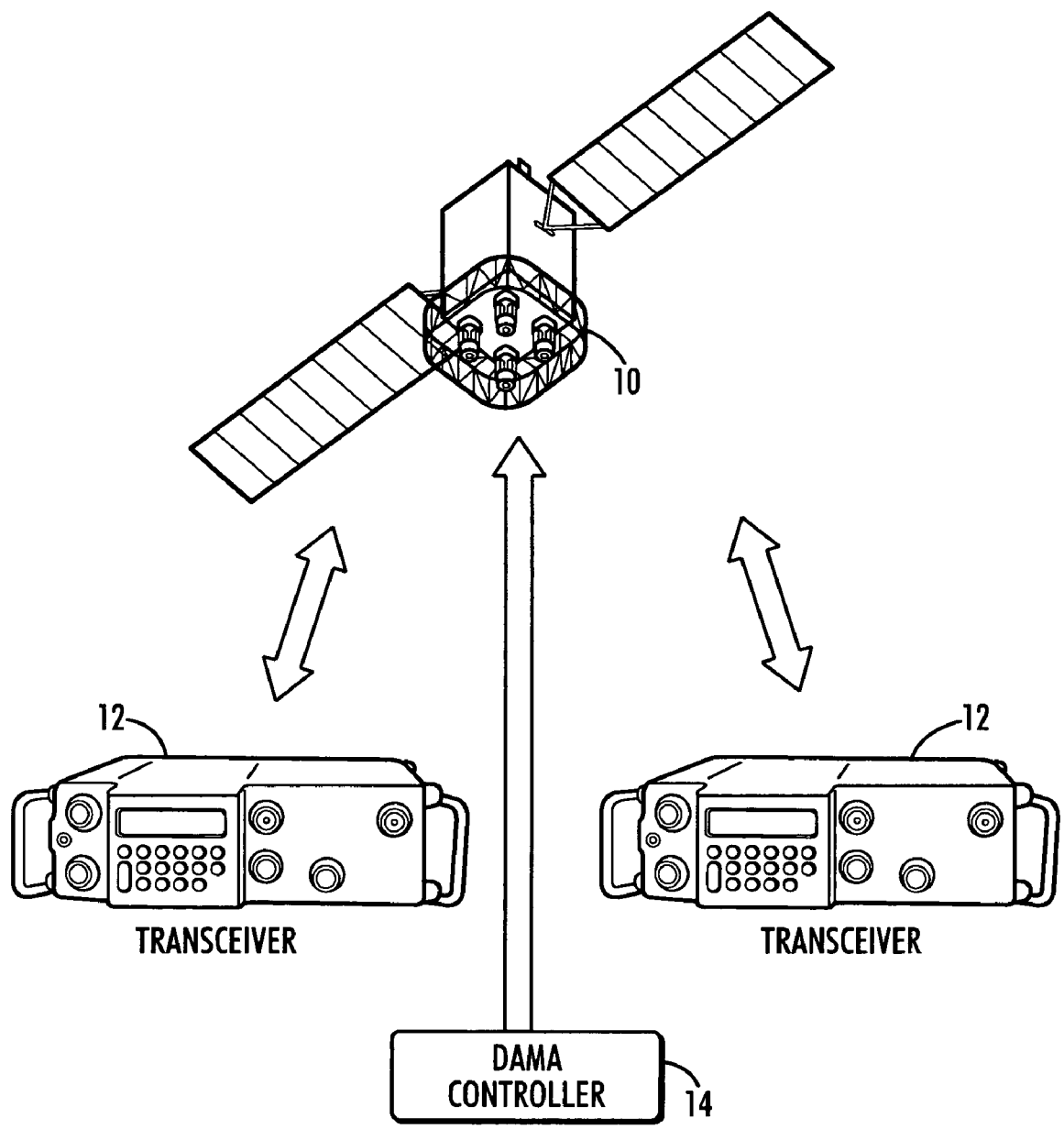
FIG. 1 is a reduced complexity illustration of a DAMA satellite communication network.

Before detailing the new and improved DAMA timeslot assignment mechanism in accordance with the present invention, it should be observed that the present invention resides primarily in a novel satellite TDMA waveform, respective iterations of which subdivide a standard length DAMA frame (or time interval) into predefined sets of timeslots, that include multiple, spaced apart, frame synchronization reference time-hacks as well as a plurality of voice/data channels, during which participant transceivers/radios of the network may conduct satellite-based (data/voice) communication sessions. This waveform is employed by the communications controllers of respective radios of the network to control when such radios may conduct satellite-linked communication TDMA voice/data communications with one or more other radios of the network.

The radios themselves are preferably implemented using currently available CPM-based modem architectures for conducting (half-duplex) communications over a standard DAMA-based (UHF) satellite link, such as one that complies with MIL-STD-188-183, referenced above. As such, the present invention involves neither a new radio architecture nor a departure from existing (mil-spec) communication network standards. As a consequence, the invention has been illustrated in the drawings by readily understandable diagrammatic illustrations, which include a generalized satellite communication network architecture diagram, and non-limiting set of TDMA waveform timeslot assignment sub-division diagrams, that show only those specific features that are pertinent to the invention, so as not to obscure the disclosure with details which will be readily apparent to one skilled in the art having the benefit of the description herein, whereby the present invention may be readily understood.

Figure 2:
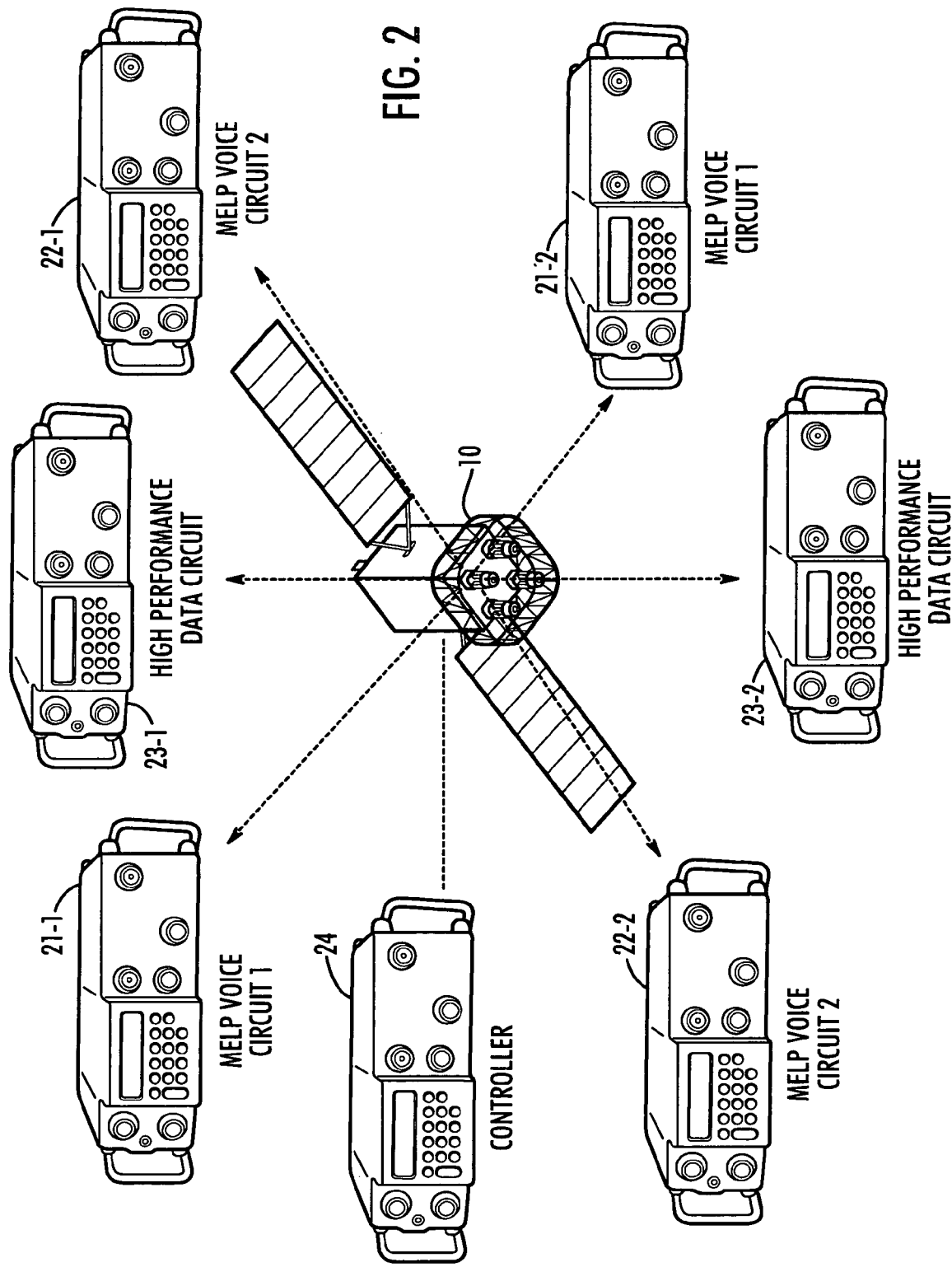
FIG. 2 is a reduced complexity diagrammatic illustration of a non-limiting example of a satellite communication network employing the DAMA timeslot assignment mechanism of the present invention.

Attention is now directed to FIG. 2, which is a reduced complexity diagrammatic illustration of a non-limiting example of a satellite communication network employing the present invention. Similar to the network of FIG. 1, the network of FIG. 2 includes satellite 10 and a plurality of terrestrial (mobile) SATCOM transceivers/radios. Each of the radios has the same implementation, preferably employing a currently available CPM-based modem architecture for conducting (half-duplex) communications through the satellite 10, over a standard DAMA-based (UHF) satellite link, such as one that complies with MIL-STD-188-183 (having a frame length of 1386.666 ms).

The SATCOM network example illustrated in FIG. 2 supports two voice channels and a single data channel. It should be observed, however, that the invention is not limited to use with this or any other voice/channel allocation within a respective DAMA frame. The illustrated example is provided to show a practical application of the invention. Other pragmatic examples will be described below with reference to the waveforms of FIGS. 7-10.

Within the network example of FIG. 2, the two voice channels include a first voice channel VC-1 through which users of radios 21-1 and 21-2 conduct voice communications with one another, and a second voice channel VC-2 through which users of radios 22-1 and 22-2 conduct voice communications with one another. As a non-limiting example, each voice channel may comprise a 9.6 kbps CPM (Mixed Excitation Linear Predictive (MELP)) voice channel. The data channel may comprise an effective 2.4 kbps data rate digital data channel DC through which users of radios 23-1 and 23-2 conduct data communications with one another.

In addition to these six radios, the network includes an additional, or auxiliary, radio 24, which serves as a 'supervisory controller' radio. This auxiliary radio has a relatively simple function—to repetitively transmit a prescribed, reduced complexity, time base reference or synchronization burst (or 'time-hack'), that is used by the other radios of the network, to control the times at which they may conduct voice/data communications through the satellite.

As pointed out briefly above, and as will be detailed below with reference to FIG. 5, the time hack contains a TDMA waveform number/code that identifies which of a plurality of potentially available iterations of the basic TDMA waveform of the invention, diagrammatically illustrated in FIG. 3, to be described, is to be used by participants of the network. The composition of each waveform iteration is defined a priori, and is stored in the radio. As a consequence, given knowledge of which iteration is to be used allows the radio to know when within that iteration all timeslots occur, including those in which the time-hack is repeated and those used for voice/data channels.

The rate at which the time-hack is repetitively transmitted by the controller radio is effective to cause the time-hack to be repeated at temporally spaced intervals within a single DAMA frame. This will ensure that, owing to propagation delay between a deployed terrestrial radio and the satellite, time coincidence of a transmission by a user during that user's assigned time slot (within the DAMA frame) with reception of one of the time-hacks will not prevent the user from acquiring TDMA frame synchronization (from another time hack within the frame).

Figure 3:
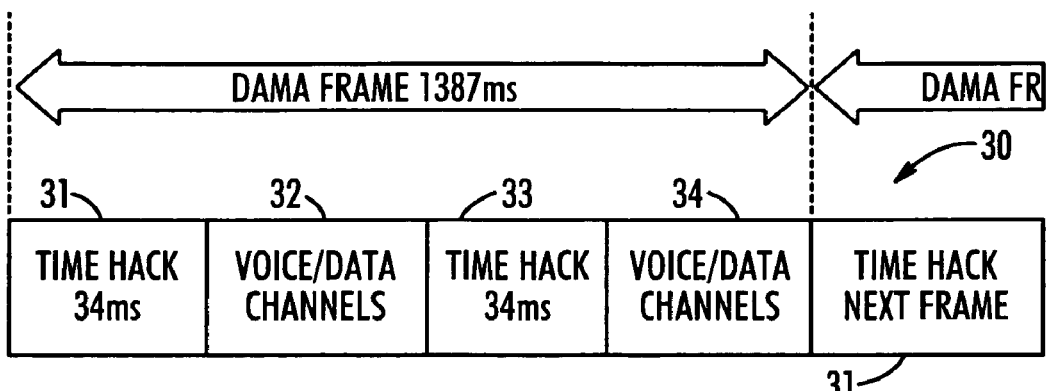
FIG. 3 diagrammatically illustrates the basic composition of the TDMA waveform of the invention.

Attention is now directed to FIG. 3, which diagrammatically illustrates the basic composition of the novel TDMA waveform of the invention. As shown therein the waveform 30 proper has a prescribed time duration or length, that corresponds to a single standard DAMA frame. In the present example of a standard MIL-STD-188-183 DAMA frame, waveform 30 has a duration of 1386.666 ms. Pursuant to the timeslot subdivision mechanism of the invention, waveform 30 is subdivided into a plurality (e.g., four timeslot segments, shown as segments 31, 32, 33 and 34 for the case of four segments. Also, as described earlier, because there is some uncertainty (e.g., on the order of several to tens of milliseconds) in the range to the satellite, the TDMA waveform preferably includes a prescribed time guard band associated with the uncertainty that is inserted between each of the timeslots into which the waveform has been subdivided.

Referring again to FIG. 3, a first of the waveform segments, shown at 31, occurs at the beginning of the frame 30 and constitutes a 'time-hack' timeslot. As pointed out above, and as will be described below with reference to FIG. 5, the first time-hack timeslot 31 (and also a second time-hack timeslot segment 33) is used to transmit a reduced complexity waveform (which may have a duration on the order of only several tens of milliseconds (e.g., 34 ms)), which specifies which one of a plurality of available frame formats, each of which contains a different arrangement of time-hack, voice and data channels, is to be used by network participants. In addition, the time-hack itself constitutes a time base reference relative to which each user knows when it may transmit on/listen to its assigned voice/data channel.

The next consecutive timeslot segment 32, that immediately follows the first time-hack timeslot segment 31, is used for voice/data communications. Voice/data timeslot segment 32 will typically contain a plurality of timeslots (or channels) that have been pre-specified for the transport of voice/data. As shown in the waveform diagram of FIG. 4, for the SATCOM network example of FIG. 2, timeslot segment 32 may comprise a first (418 ms wide) timeslot 41 for transporting the first (9.6 kbps) voice channel VC-1, which is followed by a second (418 ms wide) timeslot 42 for transporting the (2.4 kbps) data channel DC.

Figure 4:
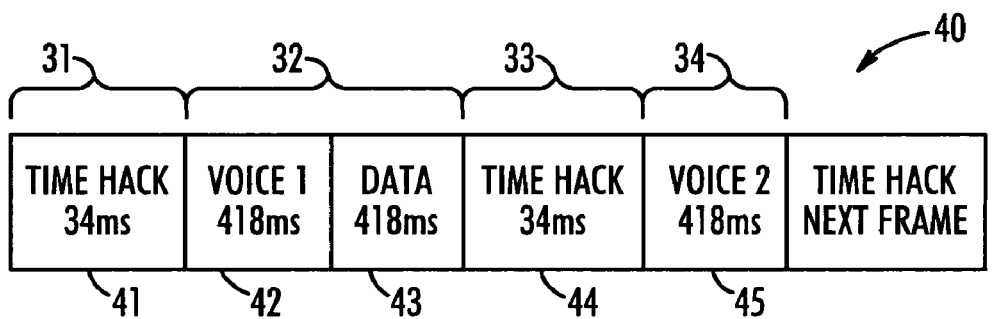
FIG. 4 is a TDMA waveform diagram used to configure the respective radios of the satellite communication network example shown in FIG. 2.

Following the first voice/data timeslot segment 32 is a second time-hack timeslot segment 33, which is identical to the first time-hack timeslot segment 31. Frame 30 concludes with a second voice/data timeslot segment 34, that immediately follows the second time-hack timeslot segment 33. Like the first voice/data timeslot segment 32, the second voice/data timeslot segment 34 will typically contain a plurality of timeslots (or channels) that have been pre-specified for the transmission of voice/data. As shown in FIG. 4, for the SAT-COM network example of FIG. 2, the second timeslot segment 34 comprises a single (418 ms wide) timeslot 43 for transporting the second (9.6 kbps) voice channel VC-2.

Figure 8:
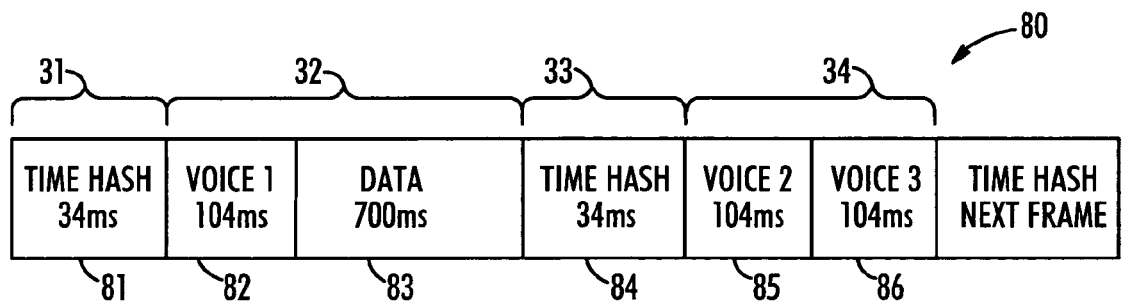
Figure 9:
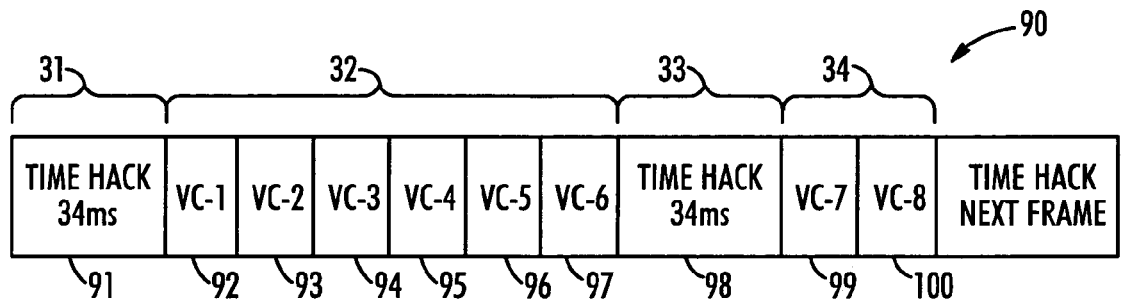
Figure 10:
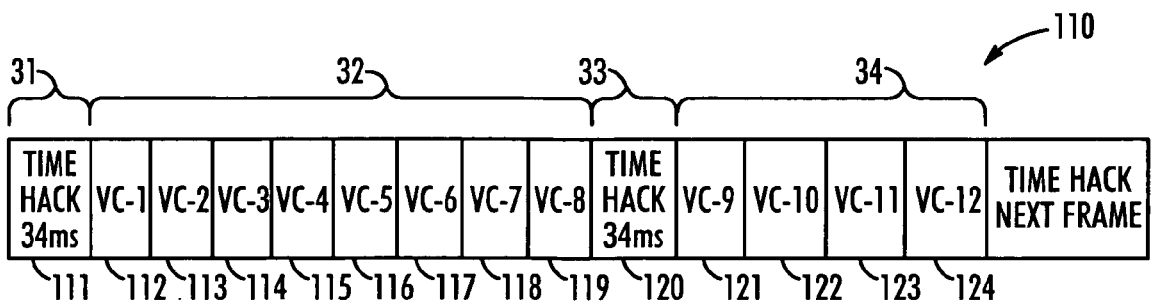

It should be noted that the number and allocation of the respective voice/data timeslots of the second voice/data timeslot segment 34 is not necessarily the same as that of the first voice/data timeslot segment 32. Indeed, as shown in each of the respective waveform diagrams of FIGS. 4 and 7-10, the allocation of voice/data channels in the second voice/data timeslot segment 34 is different from that of the first voice/data timeslot segment 32. The higher density voice/data channel allocations of the waveform diagrams of FIGS. 8-10 illustrate respective TDMA waveforms that may be employed with higher performance modems (e.g., those that perform well in a noise environment of 3.5 dB or more).

As pointed out above, there is a propagation delay between a (terrestrially deployed) radio and the satellite. This propagation delay, which is based upon the speed of light and the distance between the satellite and the radio, can be generally calculated for geographical area of deployment of the radio network, and may typically be on the order of 120 ms, one way, with some prescribed range uncertainty offset (e.g., on the order of several to tens of milliseconds).

Because of this propagation delay, and the fact that frame synchronization is referenced to the satellite, it is necessary for a user to transmit prior to the time that the transmitted message will actually arrive at the satellite, using a 'lead time' that corresponds to the propagation delay. This 'lead time' or 'in advance' transmission of a voice/data channel may overlap the time at which the time hack (that is being repeatedly transmitted by the controller radio) is arriving at the user's radio from the satellite, so that the user will not successfully receive that time hack.

Thus, for the network example of FIG. 2 and its associated waveform of FIG. 4, a voice channel transmission by either of radios 21-1 or 21-2 on voice channel VC-1 (timeslot 41) must begin at a 'lead' time that effectively compensates for the 120 milliseconds propagation delay to the satellite. However, such an 'early' transmission of voice channel VC-1 will cause voice channel VC-1 to overlap the expected time of reception of the time-hack timeslot 31 from the controller radio, so that the first time-hack 31 will not be received by the transmitting radio. Since detection of and synchronization with the time base reference (time-hack) is necessary for successful TDMA communications, overlap of the transmission on voice channel VC-1 with reception of the time-hack timeslot 31 constitutes a potential impediment to successful communications on voice channel VC-1.

Pursuant to the invention, however, because the time-hack is repeated at timeslot segment 33, which is temporally spaced apart from the VC-1 timeslot 41 by data channel DC's timeslot 42 and by voice channel VC-2's timeslot 43, the duration of each of which is longer than the propagation delay to the satellite, each of radios 21-1 and 21-2 is assured of unimpeded reception of the repeated time-hack of timeslot 33, so that these radios will receive a time base reference with which to synchronize their use of voice channel VC-1.

Figure 5:
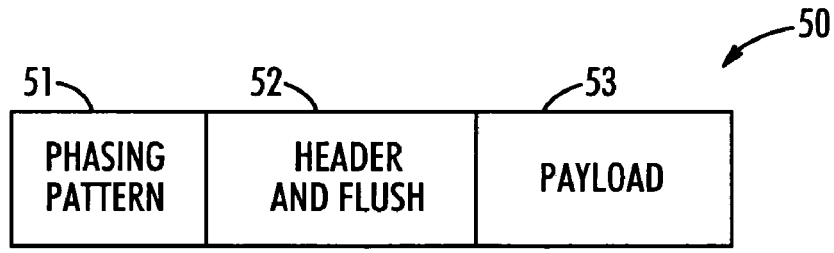
FIG. 5 diagrammatically illustrates the temporal structure of time-hack waveform employed in the present invention.

The temporal structure of the time-hack waveform transmitted within each of the timeslot segments 31 and 33 of the TDMA waveform shown in FIG. 3 is diagrammatically illustrated in FIG. 5. In contrast to the very complex and information intensive control waveforms of conventional and proposed IW-based DAMA satellite communication networks, the only information contained in the time-hack waveform employed in the present invention is a single number/code—that simply identifies the frame format of the network. As result, each radio does not have to spend a significant amount of time demodulating, recovering and processing a large quantity of configuration data. As noted above, the composition of each waveform iteration or frame format is defined a priori, and is stored in each radio. As a consequence, each radio only needs to be informed of which frame format is to be used. The radio then knows the data rates of all voice/channel timeslots and when all timeslots occur, including those in which the time-hack is repeated and those used for voice/data channels. The only configuration parameter required to be entered by the user is the channel number. This makes the radio extremely easy to use, as it can be set in a very short time interval—usually within thirty seconds.

As described above, the time-hack waveform is repetitively transmitted by the supervisory controller radio at spaced apart instances in time that are specified a priori in accordance with the particular frame format to be used by the SATCOM network. In general, these specified time-hack timeslots 31 and 33 are spaced apart by voice-channel segments 32 and 34, as shown in FIG. 3. The exact temporal locations of the time-hack timeslots will depend upon the particular frame format that is specified in the numerical code of the time-hack's payload.

Referring now to FIG. 5, the time-hack waveform is shown as comprising a standard preamble, that includes an initial phasing pattern 51 and a header 52, followed by a payload 53. The phasing pattern 51 consists of a prescribed digital code (e.g., the four bit code 1100) repeated over a given bit sequence (e.g., 156 bits long), at a predetermined modulation (e.g., MSK). The header 52 includes header packet (twelve bits repeated three times for a total of thirty-six bits) followed by a six bit flush packet, for a total of forty-two bits, MSK. The payload 53 is comprised of a prescribed number of bits (e.g., sixteen), which is an integer that specifies the frame format. For the network configuration shown in FIG. 2, having two voice channels and a single data channel, the numerical code of payload 53 will specify the TDMA frame format shown in FIG. 4.

Figure 6:
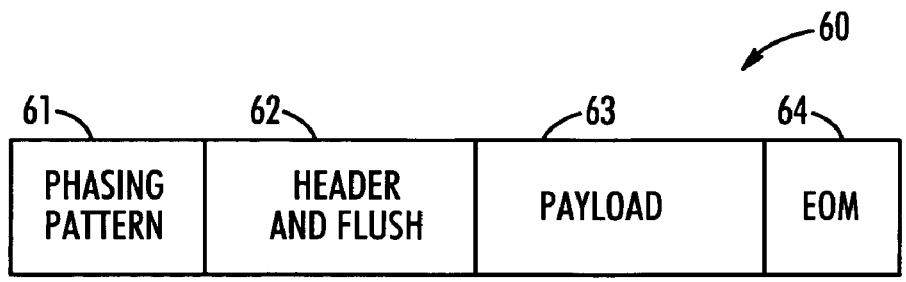
FIG. 6 diagrammatically illustrates the temporal structure of voice/channel waveform employed in the present invention.

FIG. 6 diagrammatically illustrates the temporal structure of a respective voice/data channel. As shown therein, similar to the time hack waveform of FIG. 5, a voice/data channel has a standard preamble, that includes an initial phasing pattern 61 and a header 62, followed by a payload 63. In addition, following the last bit of the payload 63 is an end-of-message (EOM) field 64. As in the time-hack waveform, the phasing pattern 61 consists of a prescribed digital code (e.g., the four bit code 1100) repeated over a given bit sequence (e.g., 156 bits long), at a predetermined modulation (e.g., MSK). Likewise, following the phasing pattern 61 is a header and flush packet 62, that includes header (twelve bits repeated three times for a total of thirty-six bits) followed by a six bit flush packet, for a total of forty-two bits, MSK. The payload 63 is comprised of the encoded bits of the voice/data channel. The EOM field 64 is a prescribed, repeated (Hex) bit sequence, such as the sequence 0xF740 0x141F 0xEC1B, repeated three times. It should be noted that the most significant bit (MSB)

of the first sequence is sent first (the '1' value associated with the 0xF of 0xF740). Also, the EOM is not sent every slot. It is sent only in the last slot of an overall message. Also, it can appear in an abbreviated slot, since the payload data has run out. In other words, the last slot is not necessarily completely filled. The EOM is required to appear on a 48-bit boundary and fill data is employed after the payload to make the message size a multiple of 48 bits. All of this is described (and required) in the MIL-STD-188-181 requirements specification.

Figure 7:
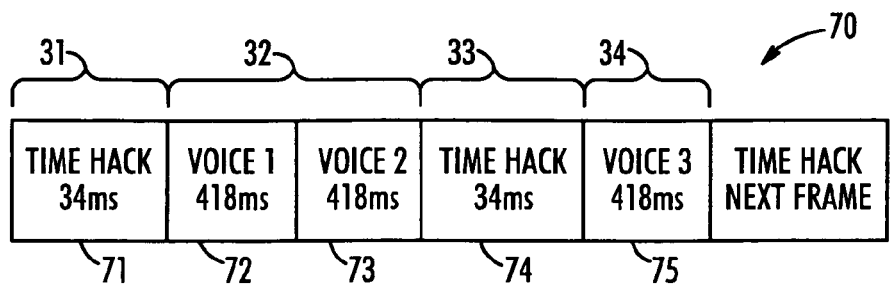
FIGS. 7-10 diagrammatically illustrate alternative embodiments of the TDMA waveform diagram of the invention associated with of voice/channel allocations respectively different from that shown in FIG. 4.

FIG. 7 diagrammatically illustrates the frame format of a TDMA waveform that is similar to the waveform diagram of FIG. 4, except that the single data channel of FIG. 4 has been replaced by a third voice channel. In particular, FIG. 7 shows a waveform 70 subdivided into five timeslots, a first of which, shown at 71, occurs at the beginning of the frame and constitutes the first (34 ms wide) 'time-hack' timeslot. The next consecutive timeslot 72, that immediately follows the first time-hack timeslot 71, is used for transporting a first (9.6 kbps) voice channel. This first voice channel is followed by a second (418 ms wide) timeslot 73 for transporting a second (9.6 kbps) voice channel. Following the second voice channel timeslot 73 is a second (34 ms wide) time-hack timeslot 74, which is identical to the first time-hack timeslot 71. The second time-hack timeslot 74 is followed by a third (9.6 kbps) voice channel timeslot 75 for transporting the third voice channels. The third voice channel timeslot 75 terminates the frame.

FIGS. 8-10 illustrate respective TDMA waveforms that may be employed with higher performance modems (e.g., those that perform well in a noise environment of 3.5 dB or more). More particularly, FIG. 8 diagrammatically illustrates the frame format of a TDMA waveform 80 for a SATCOM network that supports three 32 Kbps voice channels and a single data channel having an effective data rate of 16 kbps for a total of four voice/data channels. As shown therein, waveform 80 contains a first time-hack timeslot 81, which corresponds to the time-hack timeslot segment 31 of the basic waveform of FIG. 3, and occurs at the beginning of the frame and constitutes the first (34 ms wide) 'time-hack' timeslot. The next consecutive timeslot 82, that immediately follows the first time-hack timeslot 81, is used for transporting a first (32 kbps-104 ms wide) voice channel. The first voice channel timeslot 82 is followed by a (700 ms wide) timeslot 83 for transporting the (16 kbps) data channel DC. Voice/data channel timeslots 82 and 83 comprise the voice/data channel timeslot segment 32 of the basic waveform of FIG. 3. Following the data channel timeslot 83 is a second (34 ms wide) time-hack timeslot 84, which is identical to the first time-hack timeslot 81 and corresponds to the time-hack segment 33 of the basic waveform of FIG. 3. The second time-hack timeslot 84 is followed by successive (104 ms wide) voice channel timeslots 85 and 86 for transporting the second and third 32 kbps voice channels, respectively, which comprise the second voice/data channel timeslot segment 34 of the basic waveform of FIG. 3. The third voice channel timeslot 86 terminates the frame.

FIG. 9 diagrammatically illustrates the frame format of a TDMA waveform 90 for a SATCOM network that supports eight (32 kbps burst rate (2400 bps I/O rate)) voice channels. As shown therein, the waveform 90 is subdivided into ten timeslots, a first of which, shown at 91, occurs at the beginning of the frame and constitutes the first (34 ms wide) 'time-hack' timeslot, which corresponds to the first time-hack timeslot segment 31 of the basic waveform of FIG. 3. The next six consecutive timeslots 92-97, immediately following the first time-hack timeslot 91, correspond to the first voice/data channel timeslot segment 32 of the basic waveform of FIG. 3, and are used for transporting six respective (32 kbps (2400 bps I/O rate)) voice channels VC-1-VC-6. The sixth voice channel timeslot 97 is followed by a second (34 ms wide) time-hack timeslot 98, which is identical to the first time-hack timeslot 91, and corresponds to the second time-hack timeslot segment 33 of the basic waveform of FIG. 3. The second time-hack timeslot 98 is followed by successive (32 kbps (2400 bps I/O rate)) voice channel timeslots 99 and 100, which correspond to the second voice/data channel timeslot segment 34 of the basic waveform of FIG. 3. Voice channel timeslots 99 and 100 are used for transporting the seventh and eighth voice channels, respectively. The eighth voice channel timeslot 100 terminates the frame.

FIG. 10 diagrammatically illustrates the frame format of a TDMA waveform 110 for a SATCOM network that supports twelve (56 kbps burst rate (2400 bps I/O rate)) voice channels. As shown therein, the waveform 110 is subdivided into fourteen timeslots, a first of which, shown at 111, occurs at the beginning of the frame and constitutes the first (34 ms wide) 'time-hack' timeslot, which corresponds to the first time-hack timeslot segment 31 of the basic waveform of FIG. 3. The next eight consecutive timeslots 112-119, immediately following the first time-hack timeslot 111, constitute the first voice/data channel timeslot segment 32 of the basic waveform of FIG. 3, and are used for transporting eight respective (56 kbps (2400 bps I/O rate)) voice channels VC-1-VC-8. The eighth voice channel timeslot 119 is followed by a second (34 ms wide) time-hack timeslot 120, which is identical to the first time-hack timeslot 111, and corresponds to the second time-hack timeslot segment 33 of the basic waveform of FIG. 3. The second time-hack timeslot 120 is followed by four successive voice channel timeslots 121-124, which make up the second voice/data channel timeslot 34 of the basic waveform of FIG. 3. Voice channel timeslots 121-124 are used for transporting the ninth through twelfth (56 kbps (2400 bps I/O rate)) voice channels, respectively. The twelfth voice channel timeslot 124 terminates the frame.

As will be appreciated from the foregoing description, shortcomings of conventional and proposed IW-based DAMA satellite communication networks of the type that comply with MIL-STD-188-183, especially the difficult and time consuming process of configuring a user radio, are successfully addressed by the present invention, which employs a new and improved TDMA waveform that contains a relatively short duration and effectively minimal data content, time-hack, that is repeatedly transmitted by a supervisory control radio, so that the time hack will occur twice within a respective DAMA frame, and thereby ensures that every radio of the network will be able to acquire the time-hack, irrespective of an overlap in receipt of one of the time-hacks with a transmission by a radio, associated with the propagation delay to the satellite. In addition to providing a time reference for frame synchronization, the time-hack identifies which of a list of known frame formats stored in the radio the user is to employ. To configure the radio, it is only necessary for the user to specify the channel to be used for voice/data communications.

While we have shown and described a number of exemplary embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controlling the operation of a time division multiple access (TDMA) satellite communication network, wherein a plurality of communication devices communicate with one another over a satellite communication link with a communication satellite during respective timeslots of successive TDMA frames, said method comprising the steps of:
   (a) generating a respective TDMA frame as a plurality of frame synchronization reference timeslot segments, during which TDMA frame synchronization bursts are transmitted, and a plurality of voice/data channel timeslot segments, during which said plurality of communication devices may conduct voice/data channel communications with one another, wherein respective individual frame synchronization reference timeslot segments are temporally spaced apart from one another by respective individual voice/data channel timeslot segments; and
   (b) causing one of said plurality of communication devices to conduct voice/data communications over said satellite communication link with another of said communication devices during one of said plurality of voice/data channel timeslot segments of said TDMA frame generated in step (a), and further comprising storing, at a respective communication device, a plurality of respectively different TDMA frame formats, each of which conforms with said TDMA frame generated in step (a), but having respectively different allocations of voice/data channel timeslots within said plurality of voice/data channel timeslot segments of said TDMA frame, and causing said one of said plurality of communication devices to conduct voice/data communications over said satellite communication link with another of said communication devices, during a voice/channel timeslot of a voice/data channel timeslot segment of a selected one of said respectively different TDMA frame formats.

2. The method according to claim 1, wherein step (b) comprises causing said one of said plurality of communication devices to temporally locate a voice/data channel timeslot within said one of said plurality of voice/data channel timeslot segments, relative to the time of occurrence of one of said plurality of frame synchronization reference timeslot segments, and to conduct said voice/data communications with said another of said plurality of communication devices during said voice/data channel timeslot.

3. The method according to claim 2, wherein step (b) comprises causing said one of said plurality of communication devices to transmit on a voice/data channel at a time that overlaps receipt of a TDMA frame synchronization burst within another of said plurality of frame synchronization reference timeslot segments from said satellite.

4. The method according to claim 1, wherein each of said voice/data channel timeslot segments has a duration at least equal to the satellite propagation delay.

5. The method according to claim 1, wherein said plurality of respectively different TDMA frame formats include two or more of the following TDMA frame formats:
   i—a first TDMA frame format having first and second frame synchronization reference timeslots separated from one another by a first voice/channel timeslot segment containing a first voice channel timeslot and a data channel timeslot, and by a second voice/data channel timeslot segment containing a second voice channel timeslot,
   ii—a second TDMA frame format having first and second frame synchronization reference timeslots separated from one another by a first voice/channel timeslot segment containing first and second voice channel timeslots, and by a second voice/data channel timeslot segment containing a third voice channel timeslot,
   iii—a third TDMA frame format having first and second frame synchronization reference timeslots separated from one another by a first voice/channel timeslot segment containing a first voice channel timeslot and a data channel timeslot, and by a second voice/data channel timeslot segment containing a second and third voice channel timeslots,
   iv—a fourth TDMA frame format having first and second frame synchronization reference timeslots separated from one another by a first voice/channel timeslot segment containing six voice channel timeslots, and by a second voice/data channel timeslot segment containing two voice channel timeslots, and
   v—a fifth TDMA frame format having first and second frame synchronization reference timeslots separated from one another by a first voice/channel timeslot segment containing eight voice channel timeslots, and by a second voice/data channel timeslot segment containing four voice channel timeslots.

6. The method according to claim 1, wherein step (a) comprises the steps of:
   (a1) repetitively transmitting said TDMA frame synchronization burst at a repetition rate that conforms with temporal spacings between successive individual frame synchronization reference timeslot segments, and including, within said TDMA frame synchronization burst, information representative of said selected one of said respectively different TDMA frame formats, and
   (a2) detecting, at said plurality of communication devices, said TDMA frame synchronization burst transmitted in step (b1), and wherein
   (a3) step (b) comprises causing said one of said plurality of communication devices to conduct voice/data communications over said satellite communication link with another of said communication devices, during said voice/channel timeslot of a voice/data channel timeslot segment of said selected one of said respectively different TDMA frame formats in accordance with said information representative of said selected one of said respectively different TDMA frame formats.

7. The method according to claim 6, wherein step (a1) comprises causing a preselected one of said plurality of communication devices, other than a communication device of said plurality of communication devices that conducts voice/data channel communications over said satellite communication link, to repetitively transmit said TDMA frame synchronization burst.

8. The method according to claim 1, wherein said TDMA frame synchronization burst has a duration shorter than any voice/data channel timeslot in each of said plurality of voice/data channel timeslot segments.

9. A method of controlling the operation of a respective satellite communication device that is operative to conduct satellite communications with another satellite communication device of a plurality of satellite communication devices, during a prescribed voice/channel timeslot of a respective time division multiple access (TDMA) frame of successive TDMA frames of a TDMA satellite communication network, said method comprising the steps of:
   (a) subdividing said respective TDMA frame into a plurality of frame synchronization reference timeslot segments, during which TDMA frame synchronization bursts are transmitted, and a plurality of voice/data channel timeslot segments, during which said plurality of satellite communication devices may conduct voice/ data channel communications with one another, such that respective individual frame synchronization reference timeslot segments are temporally spaced apart from one another by respective individual voice/data channel timeslot segments, said TDMA frame synchronization bursts including information representative of a selected one of a plurality of respectively different TDMA frame formats, each of which conforms with said TDMA frame as subdivided in step (a), but having respectively different allocations of voice/data channel timeslots within said plurality of voice/data channel timeslot segments;

(b) repetitively transmitting, from one of said plurality of satellite communication devices, said TDMA frame synchronization burst, at a repetition rate that conforms with temporal spacings between successive individual frame synchronization reference timeslot segments; and (c) causing said respective satellite communication device to conduct voice/data communications with said another satellite communication device during a voice/channel timeslot within one of said plurality of voice/data channel timeslot segments of said respective TDMA frame in dependence upon one of said TDMA frame synchronization bursts, and including causing said respective satellite communication device to temporally locate a voice/data channel timeslot within a voice/data channel timeslot segment of said selected one of said respectively different TDMA frame formats relative to the time of occurrence of one of said plurality of frame synchronization reference timeslot segments, and to conduct said voice/data communications with said another satellite communication device during said voice/data channel timeslot.

10. The method according to claim 9, wherein said TDMA frame synchronization burst has a duration shorter than any voice/data channel timeslot in each of said plurality of voice/data channel timeslot segments.

11. The method according to claim 9, wherein step (c) comprises causing said respective satellite communication device to transmit on a voice/data channel at a time that overlaps receipt of a TDMA frame synchronization burst within another of said plurality of frame synchronization reference timeslot segments from said satellite.

12. The method according to claim 9, wherein said plurality of respectively different TDMA frame formats include two or more of the following TDMA frame formats:

i—a first TDMA frame format having first and second frame synchronization reference timeslots separated from one another by a first voice/channel timeslot segment containing a first voice channel timeslot and a data channel timeslot, and by a second voice/data channel timeslot segment containing a second voice channel timeslot, ii—a second TDMA frame format having first and second frame synchronization reference timeslots separated from one another by a first voice/channel timeslot segment containing first and second voice channel timeslots, and by a second voice/data channel timeslot segment containing a third voice channel timeslot, iii—a third TDMA frame format having first and second frame synchronization reference timeslots separated from one another by a first voice/channel timeslot segment containing a first voice channel timeslot and a data channel timeslot, and by a second voice/data channel timeslot segment containing a second and third voice channel timeslots, iv—a fourth TDMA frame format having first and second frame synchronization reference timeslots separated from one another by a first voice/channel timeslot segment containing six voice channel timeslots, and by a second voice/data channel timeslot segment containing two voice channel timeslots, and v—a fifth TDMA frame format having first and second frame synchronization reference timeslots separated from one another by a first voice/channel timeslot segment containing eight voice channel timeslots, and by a second voice/data channel timeslot segment containing four voice channel timeslots.

13. A satellite communication device that is operative to conduct satellite communications with another satellite communication device of a plurality of satellite communication devices, during a prescribed voice/channel timeslot of a respective time division multiple access (TDMA) frame of successive TDMA frames of a TDMA satellite communication network, the device comprising:

a communications controller to control communications including the use of the TDMA frames each of which contain a plurality of frame synchronization reference timeslot segments, during which TDMA frame synchronization bursts are transmitted, and a plurality of voice/data channel timeslot segments, during voice/channel timeslots of which the plurality of satellite communication devices may conduct voice/data channel communications with one another, such that respective individual frame synchronization reference timeslot segments are temporally spaced apart from one another by respective individual voice/data channel timeslot segments; and a memory associated with the communications controller to store a plurality of respectively different TDMA frame formats, each of which conforms with the TDMA frame, but having respectively different allocations of voice/data channel timeslots within the plurality of voice/data channel timeslot segments;

the TDMA frame synchronization burst including information representative of a selected one of a plurality of respectively different TDMA frame formats; and the communications controller being operative to temporally locate a voice/data channel timeslot within a voice/data channel timeslot segment of the selected one of the respectively different TDMA frame formats relative to the time of occurrence of one of the plurality of frame synchronization reference timeslot segments, and to conduct the voice/data communications with the another satellite communication device during the voice/data channel timeslot.

14. The satellite communication device according to claim 13, wherein said communications controller is operative to temporally locate a voice/data channel timeslot within the one of the plurality of voice/data channel timeslot segments, relative to the time of reception of one a TDMA frame synchronization burst in one of the plurality of frame synchronization reference timeslot segments, and to conduct voice/data communications with the another satellite communication device during the voice/data channel timeslot.

* * * * *